Patented Mar. 9, 1943

2,313,566

UNITED STATES PATENT OFFICE 2,313,566

MANUFACTURE OF GLASS PLATES

Rob Roy McGregor, Swissvale, Pa., assignor to Norbert S. Garbisch, Butler, Pa.

No Drawing. Application November 29, 1939, Serial No. 306,694

7 Claims. (Cl. 49—77)

The present invention relates to the treatment of siliceous materials and it has particular relation to the treatment and use of waste sand obtained in the grinding and polishing of plate glass.

One object of the invention is to convert the heretofore substantially valueless, finely puverized sand resulting from the grinding and polishing of glass into material highly valuable for many purposes, including use as a source of sand and cullet in the compounding of glass.

This and other objects will be apparent from consideration of the following specification and the accompanying claims.

In the manufacture of plate glass, the plates as initially obtained have relatively rough surfaces which for many purposes are objectionable. It is customary to subject such plates to a grinding or surfacing operation in order to remove the objectionable irregularities and to provide substantially smooth, plane surfaces.

This operation is conducted by cementing the plates with plaster of Paris to moving tables or cars which are passed successively under a series of revolving cast iron blocks or runners while granular silica (i. e. sand) is fed under the runners as a water suspension or abrasive mixture to grind away the irregularities.

In the preparation of batch employed in the manufacture of glass, sand of great purity and containing only a fraction of a per cent of iron is commonly employed. Such sand is relatively expensive and for that reason is seldom used in the grinding operation, but instead is replaced by cheaper and relatively impure river sands which initially contain many impurities, such as iron compounds and the like often in intimate association with the silica.

The relatively coarse sand initially employed in roughing off the surface of the glass gradually becomes broken and worn down during the course of operations. At the same time, it becomes charged with fine flakes or chips of glass and iron which respectively are abraded from the surface of the glass and the iron grinding discs or runners. During operations, the sand is subjected from time to time to a classifying operation in any convenient form of apparatus in order to separate relatively fine particles from the coarser particles. The coarse material is then returned for use in making the coarser cuts upon the glass surface. The fine material is advanced to a later stage and used for smoothing up the partially ground surfaces. Ultimately the sand is ground to such fine state of sub-division and is so contaminated with iron and other impurities originally present in the sand, iron abraded from the runners, rouge, fine glass chips from the glass, gypsum from the polishing tables, oil from the machinery, dust from the factory, and other materials that it can no longer be used for grinding operations.

Typically, the discarded sand is of the following composition:

|  | Per cent |
|---|---|
| Sand grains | 70 –85 |
| Glass debris | 15 –25 |
| Gypsum | 0.3– 7 |
| Rouge | 0.2– 0.5 |
| Metallic iron | 1– 2.5 |
| Organic matter | Trace |

This impure material has heretofore been finally discarded as useless waste, either by dumping it into a stream or by piling it upon any available land adjacent the factory. Either mode of disposal is highly objectionable. In case the material is allowed to run to waste in a stream or other body of water, contamination, of course, results. This in many cases is prohibited by law. The volume of sand employed in grinding plate glass is very great and it usually exceeds the amount of sand employed in the compounding of the glass. Accordingly, it is evident that an immense volume of waste is produced and if it is simply piled up, in course of time, much space is required for its storage.

The present invention is based upon the discovery that sand from glass grinding operations may by suitable treatment be purified of most of the objectionable impurities to produce a finely ground silica of great value for many purposes.

If sand of high purity, e. g. melting sand, is used for grinding operations, iron, the major portion of which is metallic iron abraded from the runners, is the most objectionable material and is usually present in amounts of about 1 to 2.5% based upon the solids content. One convenient method of removing the iron involves subjecting the wastes from the polishing operations to the action of a magnetic separator. By this method, most of the free iron resulting from abrasion of the grinding discs is removed. In the event magnetic separation is employed, the operation should succeed the conclusion of the grinding operations as promptly as possible in order to obviate excessive oxidation of the finely ground iron. The residual non-magnetic oxides or other compounds of iron may be removed by digestion of the slurry or sludge of finely divided sand with an acid, such as hydrochloric acid, sulphuric acid, tartaric acid, nitric acid, or the like following by washing to remove the resultant soluble iron compounds.

A third method of removing particles of iron and iron oxide involves froth flotation. In this operation, a selective promoter of flotation which will increase the flotability of the particles of iron is employed. If desired, the iron may be given preliminary treatment in order to increase its flotability. Such treatment includes conventional sulfidation. It also includes treatment of the slurry of impure sand with copper sulphate presumably in order to deposit thin films of copper upon the surfaces of the particles of iron. The copper coated particles may then be floated without difficulty in the same manner as copper. The copper coated particles may also be given sulfide treatment with a soluble sulfide, such as sodium sulfide, hydrogen sulfide or the like. The flotation is then effected by methods similar to those employed in the concentration of low grade ores of metal, for example, a frothing agent, such as pine oil or the like, together with a flotation promoter, such as a xanthate, mercaptobenzothiazol, or the like are added and the slurry is then blown with air to form a froth which carries most of the iron.

The removal of the iron by chlorination is also contemplated as being within the purview of the invention. In such method, the waste sand is preliminarily freed of water by conventional methods and then exposed to the action of chlorine gas at a fairly high temperature; e. g., 1400 to 1800 deg. F. Chlorination of the iron to form iron chloride results and the latter at the temperature of operation is volatilized and leaves the silica and other relatively inert materials in substantially iron-free state. Two or more of these methods may be combined. For example, the major portion of the metallic iron may be removed magnetically, or by froth flotation and any residue of iron or iron compounds then removed by digestion with acid.

The operations involved in the acid purification of a waste grinding sand may be summarized as follows:

1. Collect the slurry from grinding operations in large tank or other suitable container.
2. Allow the slurry to settle and decant the clear liquid. The water content is thus reduced from 90 per cent to 50 per cent.
3. Agitate the thickened slurry in the same tank or in a smaller tank as may be convenient with an acid (i. e. hydrochloric or sulfuric). Enough acid is usually added to give an acid concentration of about 5 per cent.
4. Wash sand preferably by decantation.
5. Separate sand from water; e. g. by filtration.
6. Dry finely divided product.

For purposes of improving the color of the dry sand, it may be calcined at suitable temperatures; e. g., 1400 deg. to 1800 deg. F. Such calcination removes organic and volatile impurities. If it is conducted at a suitable temperature, it will also tend to sinter the glass particles and to bind the particles of silica into porous, but coherent masses, which in the form of briquettes or lumps are especially suitable for use in the formation of glass batches.

The sand resulting from the removal of the iron still contains the finely ground glass cullet. This cullet is desirable for many purposes. For example, in the manufacture of glass, it is necessary to add a large percentage of cullet to the batch for purposes of reducing the melting point of the batch and for purposes of otherwise promoting the operation of the glass furnace. The cullet commonly constitutes about 25 per cent of the batch and is usually in the form of crushed fragments of glass resulting from the various operations. It is found that grinding sand, after removal of the iron, contains the cullet already ground to an extremely fine state of subdivision and uniformly distributed in the sand. Crushing and mixing operations usually employed in preparing the silica and cullet for use are thus obviated.

A suitable glass batch in which the iron free sand may be employed with good results would comprise about 65 to 80 per cent of silica (supplied wholly or in substantial part, e. g. 50% by the purified waste sand), about 12 to 20 per cent of calcium oxide or its equivalent of calcium carbonate or calcium sulfate, and alkali, about 10 to 20 per cent of alkali metal compounds, such as sodium or potassium carbonate, or mixtures of the two or equivalent amounts of other sodium or potassium compounds. Other ingredients such as barium, boron, cobalt and the like may also be included in the batch for special purposes. The finely divided silica will usually contain about 20 per cent of glass cullet in very finely divided form. If desired additional cullet may be incorporated. This batch may be briquetted with water glass, tar or other binders and recycled directly to the pots or tanks from which the glass used to form the plates to be ground and polished is taken.

The forms of the invention herein described are illustrative of the principles of the invention. It will be apparent that numerous modifications may be made therein without departure from the spirit of the invention or the scope of the appended claims.

What I claim is:

1. In the process of manufacturing ground and polished glass plates in which the plates are formed from molten glass and then passed successively under grinding runners supplied with a slurry of sand as an abrasive, the steps which comprise employing glass batch sand initially substantially free of iron compounds in forming the slurry, performing the desired surfacing operation upon the plates to form a slurry, comprising as its main ingredients very finely divided silica, 10 to 30 per cent of glass and about 1 to 2.5 per cent of iron, the iron being added by the grinding operation, removing said iron from the slurry while the slurry is fresh, then removing at least the major portion of the water from the slurry, incorporating the resultant mixture of silica and glass with the alkali and alkali earth fluxes of the glass batch and melting the mixture to replenish the supply of glass for forming additional glass plates.

2. A process as defined in claim 1 in which the waste sand from the grinding and polishing operation is of a particle size, such that most of it will pass a screen of 325 mesh.

3. A process as defined in claim 1 in which the waste sand is purified of the added iron first by subjecting it to the action of a magnetic separator while the sand is in water suspension and the resultant material is then treated with a diluted solution of strong mineral acid in order to remove residual iron and subsequently the mineral acid and the dissolved salts therein are washed out and the sand is dried.

4. A process of manufacturing glass, which process comprises admixing the alkali and alkali earth fluxes of a glass batch with the very finely-divided and substantially iron-free mixture of silica and glass resulting from the surfacing glass plates with a water slurry of sand of glass batch purity and then treating the mixture with dilute mineral acid to eliminate iron added in the grinding process, and subsequently fusing the mixture into a homogeneous glass state.

5. A process of manufacturing glass, which process comprises admixing the alkali and alkali earth metal fluxes of a glass batch with a mixture of silica and glass from the surfacing of glass plates with a water slurry of sand of glass batch quality, the mixture being of a particle size to admit of passage of most of it through a screen of about 325 mesh, said mixture comprising about 10 to 25 per cent of glass and the remainder being essentially silica, the mixture having had any iron added by the grinding operation, removed by appropriate treatment while the mixture is still fresh, the process further comprising fusing the mixture of silica, glass and fluxes down into a homogeneous glass body.

6. A process of manufacturing glass, which process comprises performing a glass surfacing operation with the pure sand of a glass batch, in water suspension as an abrasive to obtain an intimate mixture of silica and glass chips constituting cullet in said batch, the mixture being of particle size to pass a screen of about 325 mesh, removing excess water and iron from the mixture, adding alkali and alkali earth metal fluxes of said glass batch to the mixture, forming the mixture into bodies of a size suitable for supplying to a glass furnace, then melting them down in such furnace to form glass.

7. A process of preparing a glass batch comprising silica cullet and alkali and alkaline earth metal fluxes, which process comprises grinding glass with a water suspension of sand of glass batch purity until the sand is broken up and intimately admixed with glass chips from the glass, said mixture being of a particle size to pass a screen of about 325 mesh and comprising about 12 to 25 per cent of glass, then removing excess water and adding alkali and alkaline earth metal fluxes of the batch and forming mixture into coherent bodies of a size for addition to a glass batch.

ROB ROY McGREGOR.